(12) United States Patent
Suzuki (10) Patent No.: US 6,402,172 B1
(45) Date of Patent: Jun. 11, 2002

(54) SUSPENSION FRAME CONSTRUCTION

(75) Inventor: Tomoyuki Suzuki, Hamamatsu (JP)

(73) Assignee: Suzuki Motor Corporation, Shizuoka-ken (JP)

( * ) Notice: Subject to any disclaimer, the term of this patent is extended or adjusted under 35 U.S.C. 154(b) by 0 days.

(21) Appl. No.: 09/667,177

(22) Filed: Sep. 21, 2000

(30) Foreign Application Priority Data

Sep. 24, 1999 (JP) ............................................ 11-270064

(51) Int. Cl.⁷ ................................................ B62D 21/11
(52) U.S. Cl. .................................. 280/124.109; 280/781
(58) Field of Search ................................ 280/781, 785, 280/786, 787, 788, 784, 124.109; 296/194, 204, 203.02; 180/311, 312

(56) References Cited

U.S. PATENT DOCUMENTS 5,573,274 A * 11/1996 Koketsu ...................... 280/781
5,611,569 A * 3/1997 Sekiguchi et al. ........... 280/788
5,899,498 A * 5/1999 Horton ........................ 280/781

FOREIGN PATENT DOCUMENTS

JP          07179180 A    7/1995

* cited by examiner

Primary Examiner—Brian L. Johnson
Assistant Examiner—Faye M. Fleming
(74) Attorney, Agent, or Firm—Alston & Bird LLP (57) ABSTRACT

There is provided an automotive suspension frame construction in which an upper plate and a lower plate are joined to one another to form a suspension frame, suspension lower arm support portions are provided on each side, right and left, of the suspension frame, and an engine mount member mounting portion is provided at a substantially central portion of the suspension frame, wherein the engine mount member mounting portion 12 of the suspension frame 5 is formed into a closed cross section S and a reinforcement 14 is disposed in the closed cross section S, cylindrical elements 13 through which engine mount member fastening members are inserted are caused to penetrate the upper plate 8, reinforcement 14, and lower plate 9 at positions corresponding to the engine mount member mounting portion 12 of the suspension frame 5, and the upper plate 8, reinforcement 14, and lower plate 9 are welded to the cylindrical elements 13. Thereby, the rigidity can be increased when a brake is applied or when an engine mount load is applied.

5 Claims, 11 Drawing Sheets

SUSPENSION FRAME CONSTRUCTION

FIELD OF THE INVENTION AND RELATED ART STATEMENT

The present invention relates to an automotive suspension frame construction for supporting suspension lower arms, an engine mount member, and the like.

Generally, vehicle body constructions of a motor vehicle are broadly divided into a framed construction used for trucks etc. and a frame-less construction used for passenger cars etc. For the frame-less construction, an attempt to increase the torsional rigidity is made by incorporating side members and cross members as a part of a body instead of using a frame. Chassis parts are installed directly to the body, but on some types of vehicles, they are assembled to the body after being installed to a partial frame or a sub-frame.

This sub-frame is usually referred to as a suspension frame because the suspension lower arms are installed to both sides thereof. Hereafter, the sub-frame etc. are generally referred to as a suspension frame.

The suspension frame is fitted with the suspension lower arms, a stabilizer, and the like, and thereafter is assembled to a vehicle body. The suspension frame is generally formed by an upper plate, a lower plate, and lower arm mounting brackets, as its basic construction.

Figure 8:
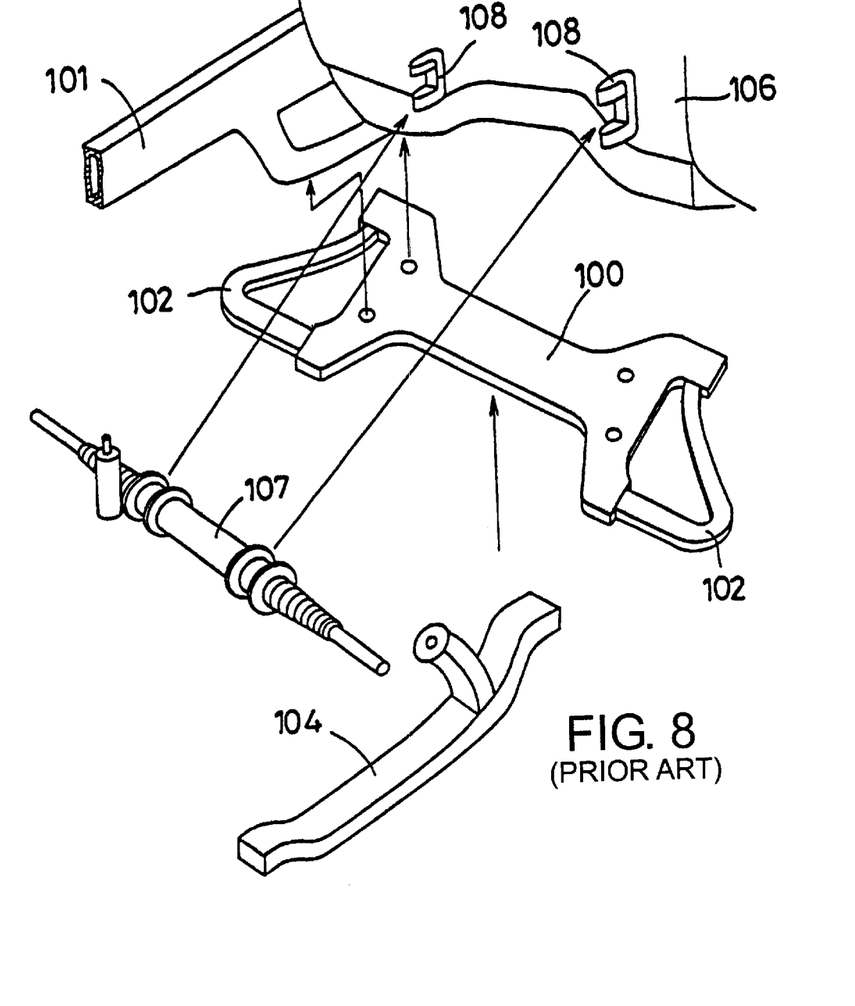
FIG. 8 is an exploded perspective view of a conventional suspension frame construction.
Figure 9:
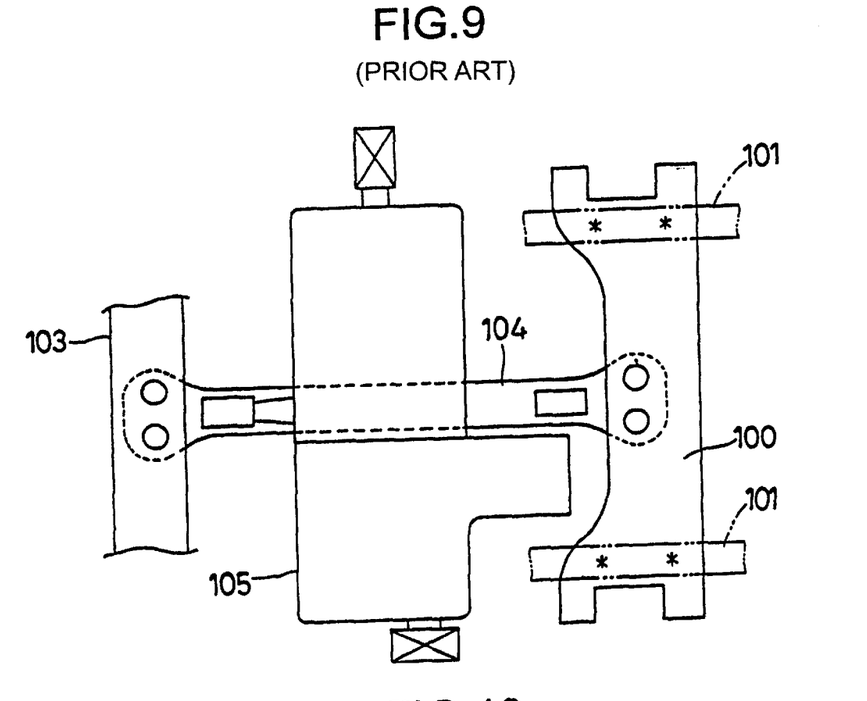
FIG. 9 is a plan view of the conventional suspension frame construction.
Figure 10:
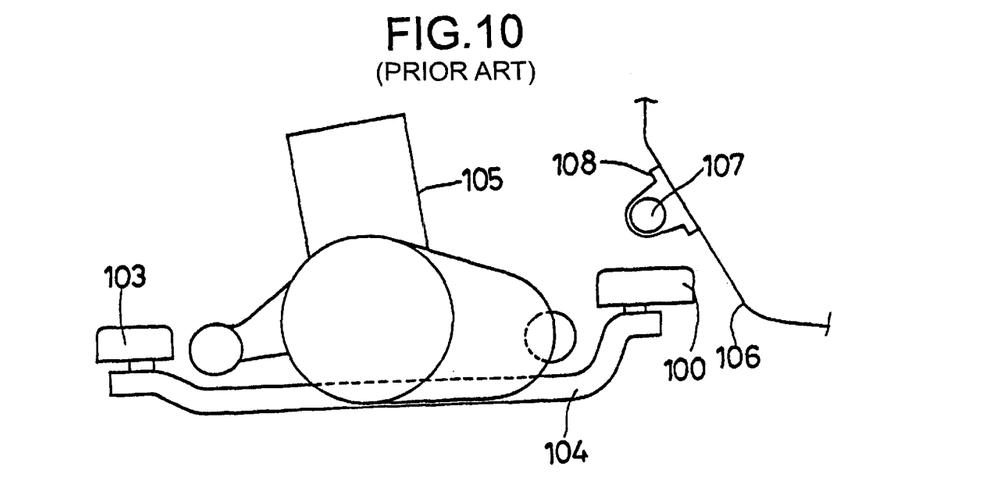
FIG. 10 is a side view of FIG. 9.

FIGS. 8 to 10 show a construction of a conventional suspension frame (Japanese Patent Provisional Publication No. 7-179180).

A suspension frame 100 is supported by a pair of side members 101, 101 on both sides, and suspension lower arms 102, 102 are installed on both sides of the suspension frame 100. A center member 104 is installed between the suspension frame 100 and a cross member 103 provided in the front, and an engine 105 is assembled onto the center member 104.

The suspension frame 100 is usually disposed at the lower part of an engine room partitioned by a dash panel 106, and various kinds of equipment etc. are assembled to the suspension frame 100. The dash panel 106 is fitted with a steering knuckle 107 by means of brackets 108.

Figure 11:
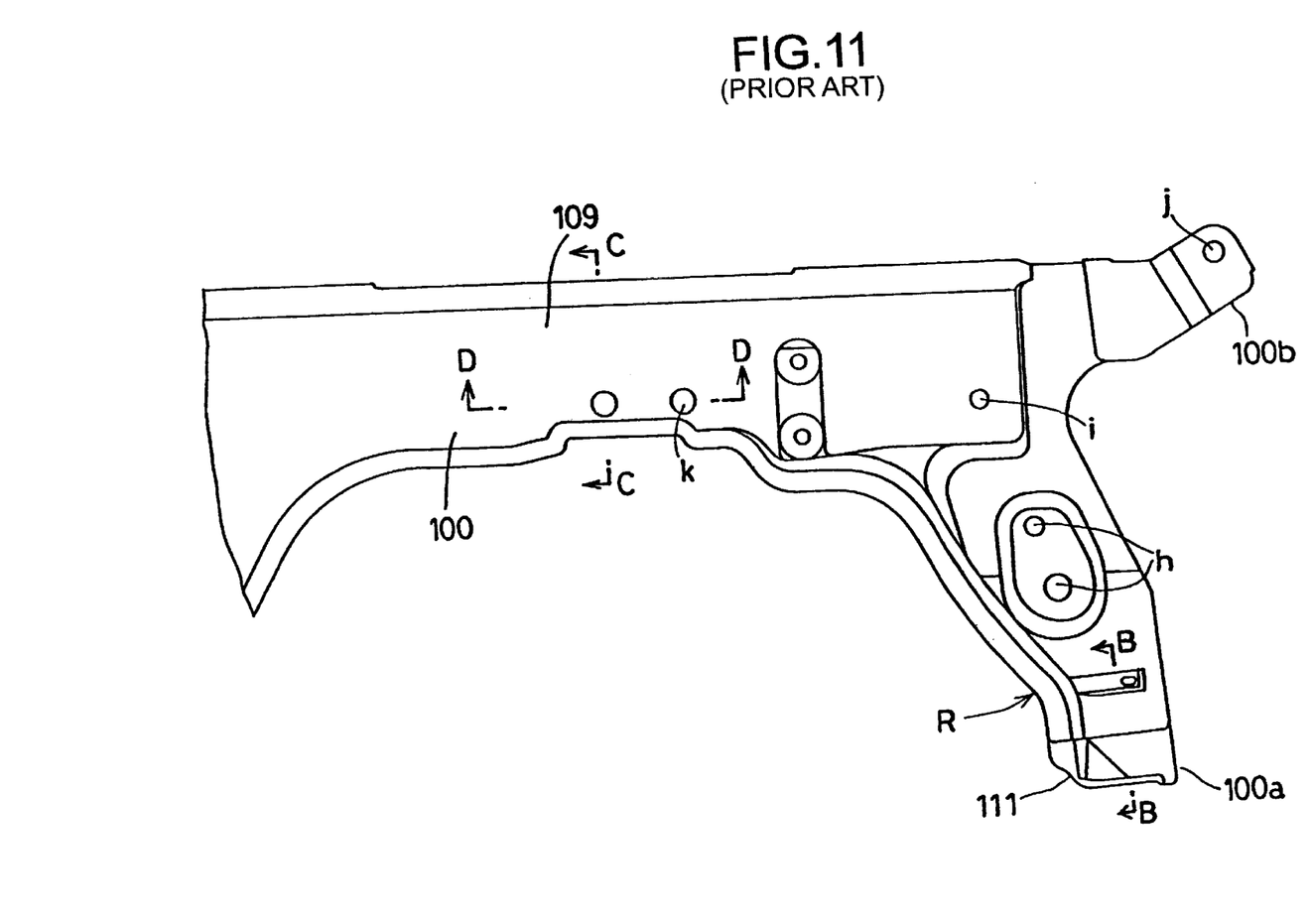
FIG. 11 is a plan view of the conventional suspension frame construction.
Figure 12:
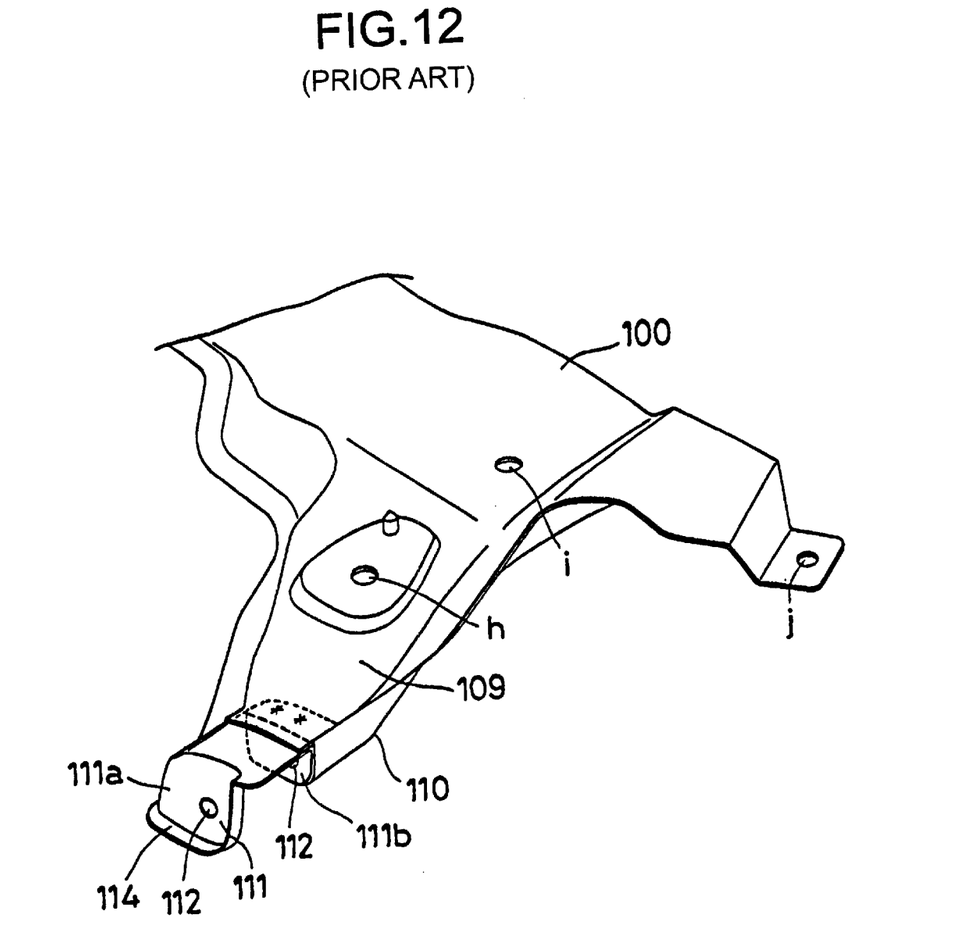
FIG. 12 is a perspective view of the conventional suspension frame construction.
Figure 13:
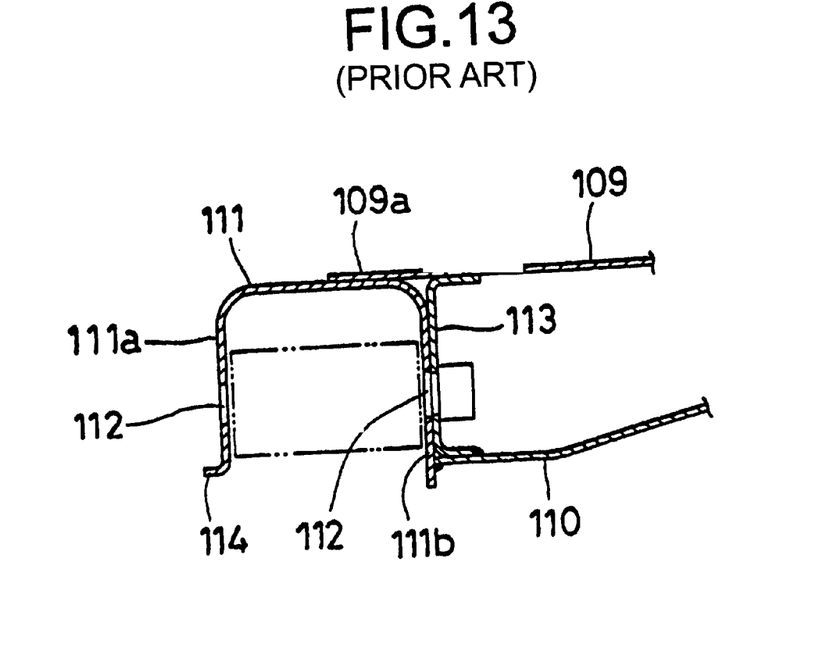
FIG. 13 is a sectional view taken along the line B—B of FIG. 11.

As shown in FIGS. 11 to 13, the suspension frame 100 is formed by joining an upper plate 109 to a lower plate 110 by welding or the like. These plates 109 and 110 are usually formed by pressing a steel sheet or the like. On both sides, right and left, of the suspension frame 100, vehicle body mounting portions h, i and j for mounting the suspension frame 100 to a vehicle body are provided. On both sides in the vehicle width direction of the suspension frame 100, a pair of suspension lower arm mounting portions 100a, 100b are provided. At this suspension lower arm mounting portion 100a on the front side of the vehicle body, a lower arm mounting bracket 111 is provided in a cantilever manner.

The lower arm mounting bracket 111 is formed into a substantially square box shape with one side face being open by pressing or the like, and on opposed wall faces 111a and 111b are provided pivotally supporting portions 112, 112 for the suspension arm 102, 102. Since the lower arm mounting bracket 111 is supported in a cantilever manner on the outside of the vehicle body mounting portions h, i and j of the suspension frame 100, this configuration provides a construction that suffers disadvantages of low rigidity, decreased steering stability, and high vibrating noise.

As shown in FIG. 13, the mounting portion of the lower arm mounting bracket 111 is joined by partially lapping a distal end portion 109a of the upper plate 109 on the top face of the lower arm mounting bracket 111. Also, the distal end of the lower plate 110 is butted against the wall face of the lower arm mounting bracket 111, so that a reinforcement 113 is installed between the upper plate 109 and the lower plate 110 to reinforce the lower arm mounting bracket 111. Further, a flange portion 114 is provided along the opening end portion of the lower arm mounting bracket 111 to increase the rigidity of the lower arm mounting bracket 111.

The suspension frame 100 is subjected to the severest condition when a longitudinal load is applied (on an actual vehicle, when a brake is applied, when a wheel drops down into a pothole, or on other occasions).

Figure 14:
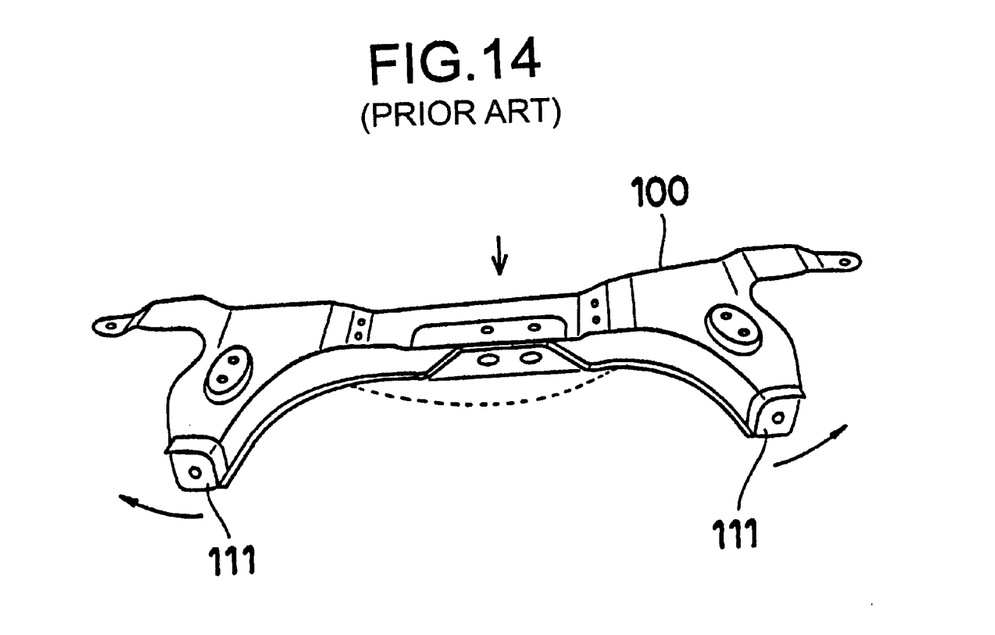
FIG. 14 is a perspective view showing a deformation mode of the conventional suspension frame construction at the time of braking load application.

The deformation mode of the suspension frame 100 at the time of braking load application is, as shown in FIG. 14, a mode in which the mounting portions of the lower arm mounting brackets 111 are opened to the outside while being twisted, and the central portion of the suspension frame 100 is lowered.

The central portion of the suspension frame 100 is lowered in the same manner when a load is applied from an engine mount member at the time of sudden start.

Figure 15:
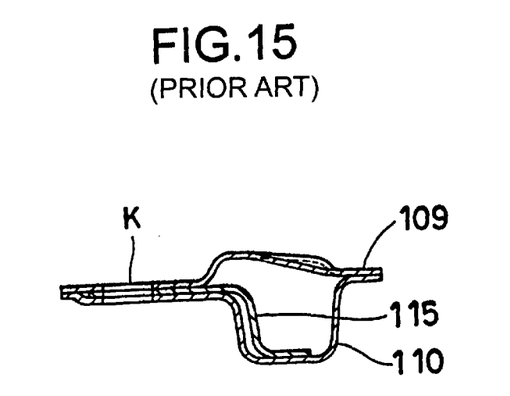
FIG. 15 is a sectional view taken along the line C—C of FIG. 11.
Figure 16:
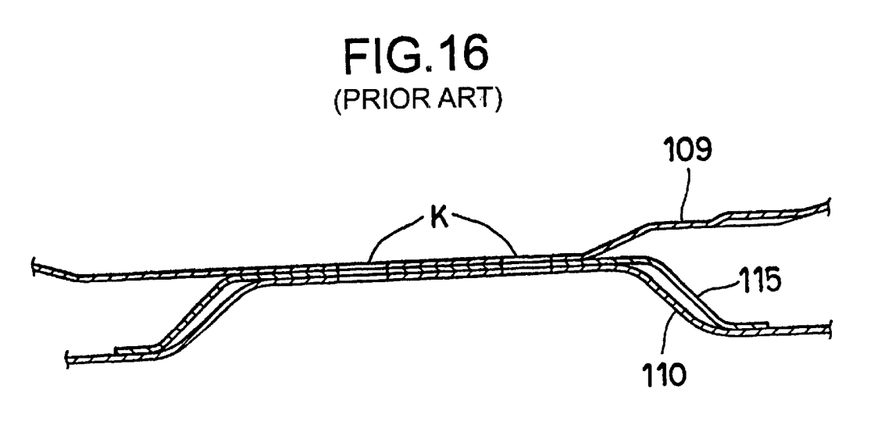
FIG. 16 is a sectional view taken along the line D—D of FIG. 11.

Conventionally, therefore, as shown in FIGS. 15 and 16, a reinforcement 115 is disposed between the upper plate 109 and the lower plate 110 to reinforce the central portion of the suspension frame 100. The upper plate 109 and the lower plate 110 are lapped on one another on the front side and form a closed curved surface on the rear side in the longitudinal direction of the vehicle body, and on the front side, the reinforcement 115 is held between the upper plate 109 and the lower plate 110, and the rear end portion of the reinforcement 115 is welded to the lower face of the closed curved surface on the rear side. Thus, engine mount member mounting portions k are formed at portions where the upper plate 109, the lower plate 110, and the reinforcement 115 are lapped on one another.

However, although the engine mount member mounting portions k are formed by lapping the upper plate 109, the lower plate 110, and the reinforcement 115 on one another, they are lowered by a load applied from the engine mount member at the time of sudden start, so that the rigidity is insufficient. Also, since the primary natural frequency of the suspension frame 100 resonates with the vehicle body, a mass damper is needed.

OBJECT AND SUMMARY OF THE INVENTION

The present invention has been made to solve the above problems, and accordingly an object thereof is to provide an automotive suspension frame construction that can increase the rigidity when a brake is applied or when an engine mount load is applied.

To achieve the above object, the present invention provides an automotive suspension frame construction in which an upper plate and a lower plate are joined to one another to form a suspension frame, suspension lower arm support portions are provided on each side, right and left, of the suspension frame, and an engine mount member mounting portion is provided at a substantially central portion of the suspension frame, wherein the engine mount member mounting portion of the suspension frame is formed into a closed cross section and a reinforcement is disposed in the closed cross section, cylindrical elements through which engine mount member fastening members are inserted are caused to penetrate the upper plate, reinforcement, and lower plate at positions corresponding to the engine mount member mounting portion of the suspension frame, and the upper plate, reinforcement, and lower plate are welded to the cylindrical elements.

Also, in the present invention, the reinforcement is disposed slantwise in the longitudinal direction of a vehicle body.

Further, in the present invention, a joint portion of the reinforcement and the cylindrical elements is formed into a horizontal shape.

Still further, in the present invention, the front end portion of at least the central portion of the upper plate is lowered to be joined to the front end portion of the central portion of the lower plate, and the rear end portion of at least the central portion of the lower plate is raised to be joined to the rear end portion of the central portion of the upper plate, whereby a closed cross-sectional construction is formed at the central portion of the suspension frame, and a front end flange portion of the reinforcement is joined to the front lower face of the lower plate and the rear end thereof is joined to the rear upper end of the lower plate by being butted against it.

Further, the present invention provides an automotive suspension frame construction in which an upper plate and a lower plate are joined to one another to form a suspension frame, suspension lower arm support portions are provided on each side, right and left, of the suspension frame, and an engine mount member mounting portion is provided at a substantially central portion of the suspension frame, wherein the engine mount member mounting portion of the suspension frame is formed into a closed cross section and a portion around the engine mount member mounting portion of the lower plate is formed by being raised, the raised portion is covered by a reinforcement to form a box shape, cylindrical elements through which engine mount member fastening members are inserted are caused to penetrate the upper plate, lower plate, and reinforcement at positions corresponding to the engine mount member mounting portion of the suspension frame, and the upper plate, lower plate, and reinforcement are welded to the cylindrical elements.

DETAILED DESCRIPTION OF PREFERRED EMBODIMENTS

Embodiments of the present invention will now be described in detail with reference to the accompanying drawings.

Figure 1:
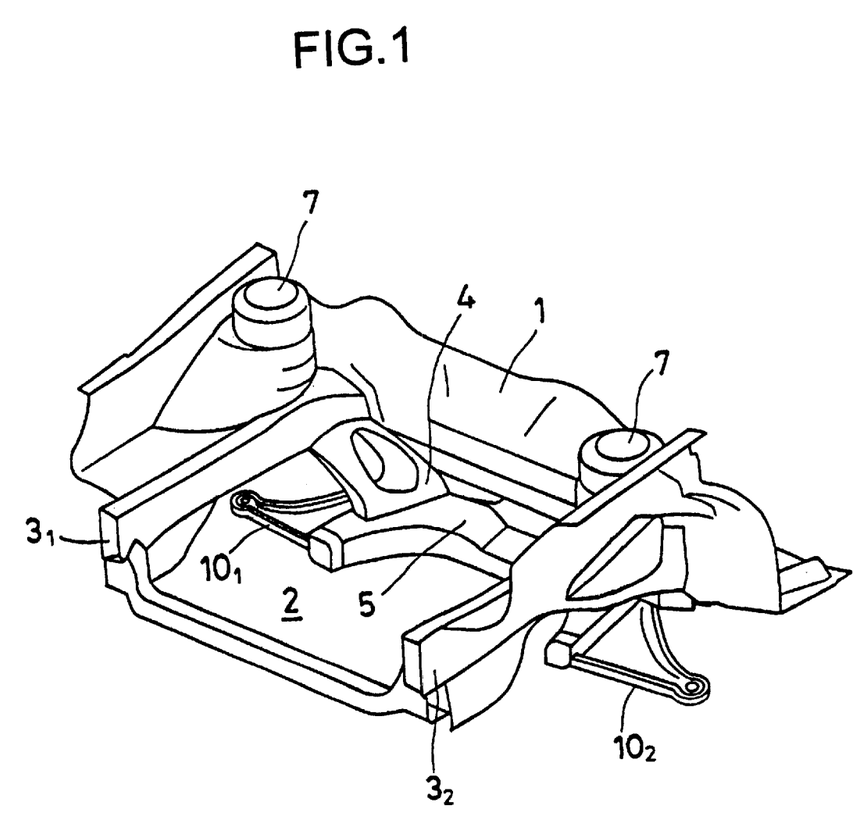
FIG. 1 is a schematic perspective view showing an embodiment of an automotive suspension frame construction in accordance with the present invention.
Figure 2:
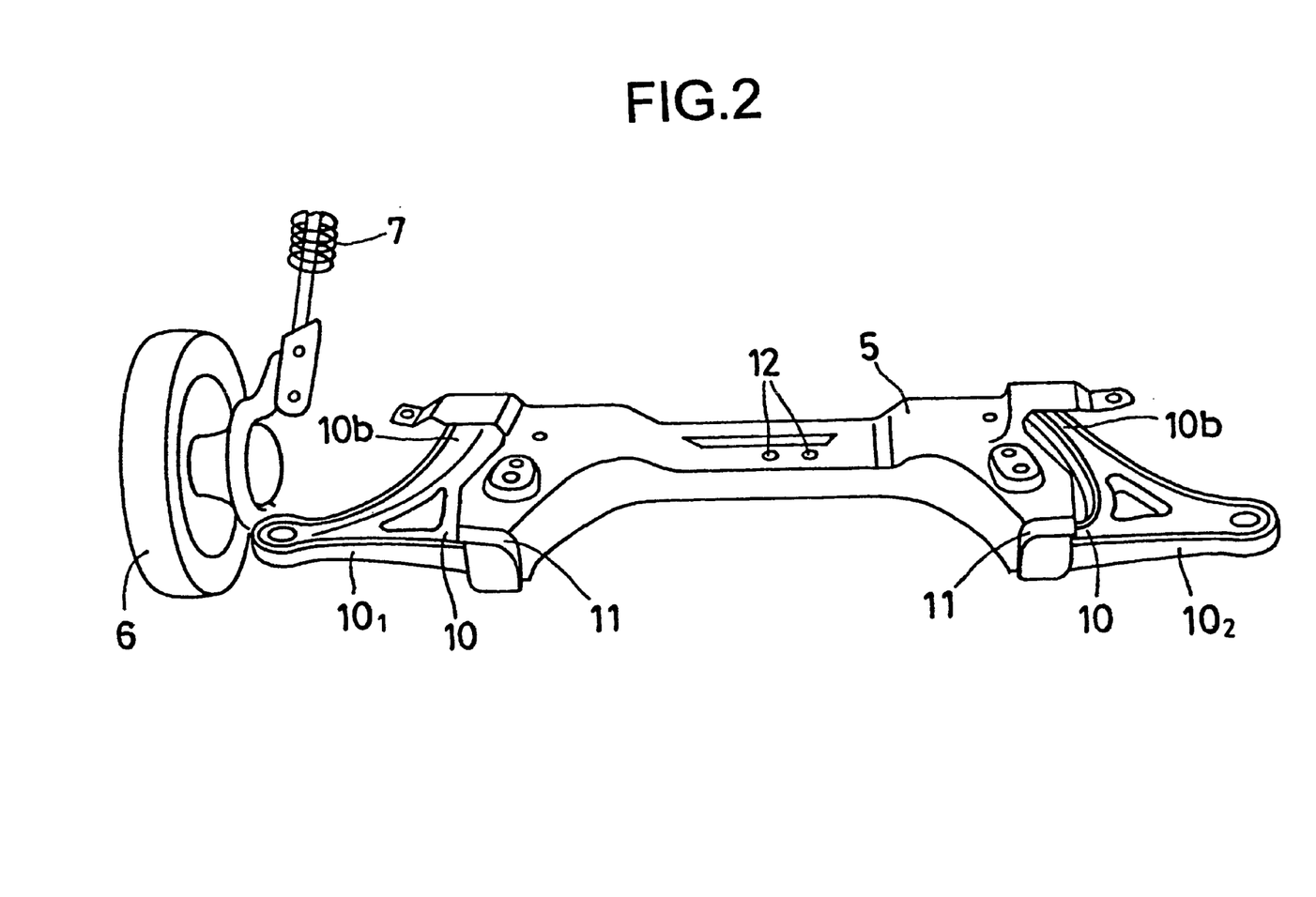
FIG. 2 is a perspective view of the suspension frame construction shown in FIG. 1.

FIG. 1 shows a vehicle body front part of a motor vehicle. In an engine room 2 partitioned by a dash panel 1, a suspension frame 5 is disposed on front side members $3_1$ and $3_2$, which are disposed on both sides of a vehicle body of the motor vehicle, via brackets 4 on the bottom surface side of the engine room. On the outside of the front side member $3_1$, $3_2$, a strut 7 for suspending a right or left wheel 6 is provided as shown in FIG. 2.

The construction of the suspension frame 5 will be described with reference to FIGS. 3 to 6.

Figure 3:
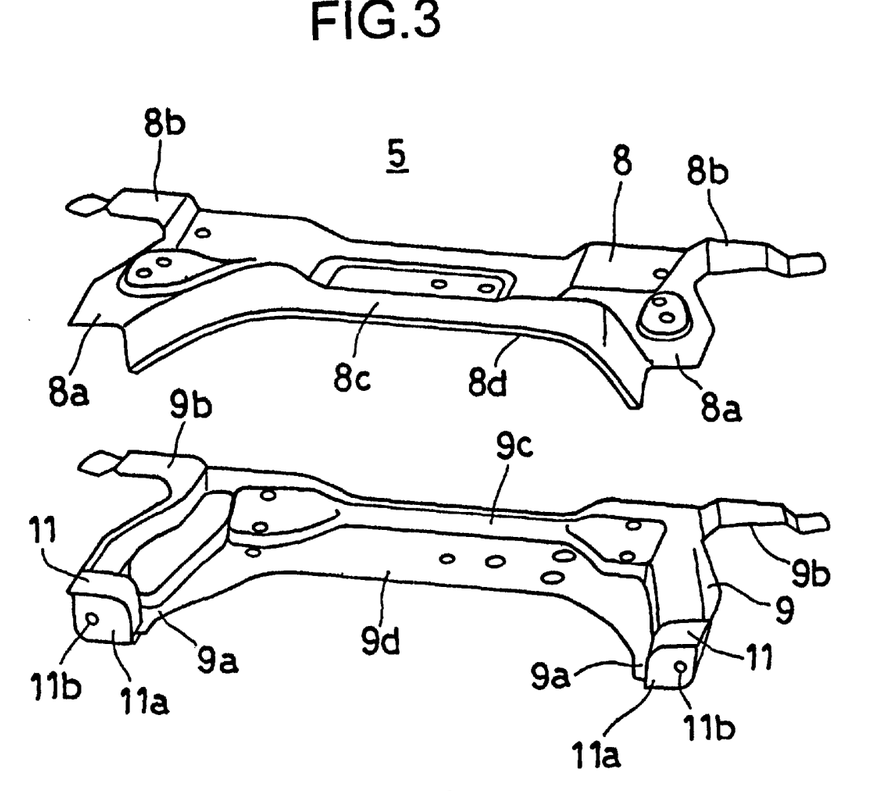
FIG. 3 is an exploded perspective view showing an upper plate and a lower plate of the suspension frame construction shown in FIG. 2.
Figure 4:
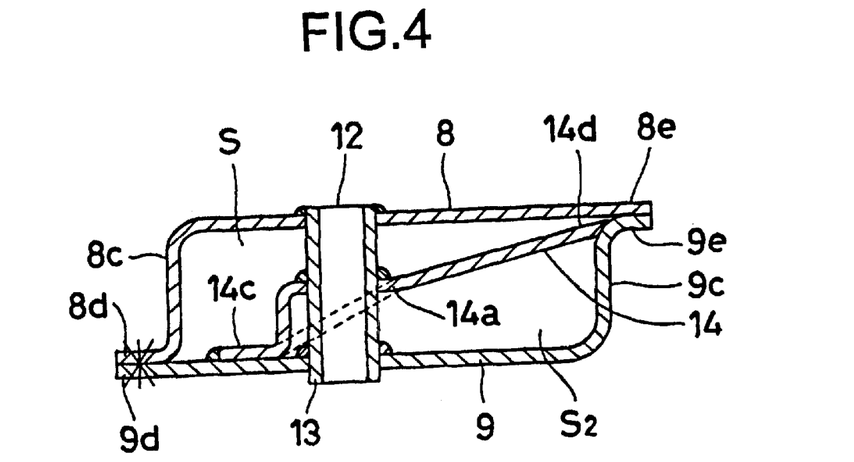
FIG. 4 is a sectional view taken along the line A—A of FIG. 2.

As shown in FIGS. 3 and 4, the suspension frame 5 is formed by pressing an upper plate 8 and a lower plate 9 and by joining the upper plate 8 to the lower plate 9 by welding or the like to form a cross-sectional construction S. The upper plate 8 is formed by bending down the front end portion of a flat steel plate, and is provided with suspension lower arm support portions 8a and 8b for supporting arms 10a and 10b of suspension lower arms $10_1$ and $10_2$, respectively, on each side, right and left, thereof.

On the other hand, the lower plate 9 is formed by bending up the rear end portion of a flat steel plate, and is provided with suspension lower arm support portions 9a and 9b for supporting arms 10a and 10b of suspension lower arms $10_1$ and $10_2$, respectively, on each side, right and left, thereof. The suspension frame 5 forms a closed cross section S by joining a flange portion 8d provided along the edge of a front end lowering portion 8c of the upper plate 8 to a front end edge portion 9d of the lower plate 9 and by joining a flange portion 9e provided at a rear end rising portion 9c of the lower plate 9 to a rear end edge portion 8e of the upper plate 8.

At both end portions, right and left, of the suspension frame 5, there are provided right and left lower arm mounting brackets 11, 11 each of which is supported by the suspension lower arm support portion 8a of the upper plate 8 and the suspension lower arm support portion 9a of the lower plate 9.

The lower arm mounting bracket 11 is formed substantially into a box shape by pressing, and one side face of this box shape is opened to form a support portion for an oscillation shaft of the suspension lower arm 10. In each of front and rear wall faces 11a of the box shape, which are opposed in the longitudinal direction of the vehicle body, there is formed a mounting hole 11b for mounting the oscillation shaft of the suspension lower arm 10.

Figure 5:
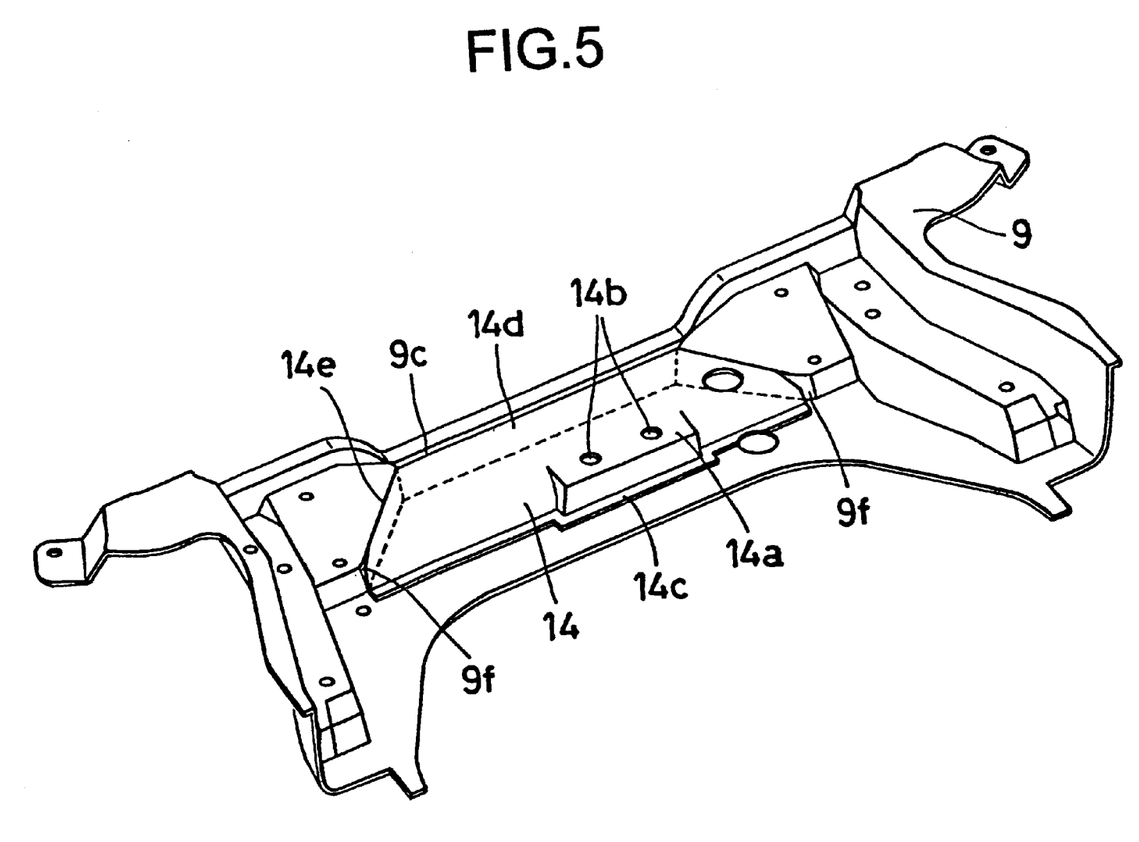
FIG. 5 is a perspective view showing the suspension frame construction shown in FIG. 4 excluding the upper plate.
Figure 6:
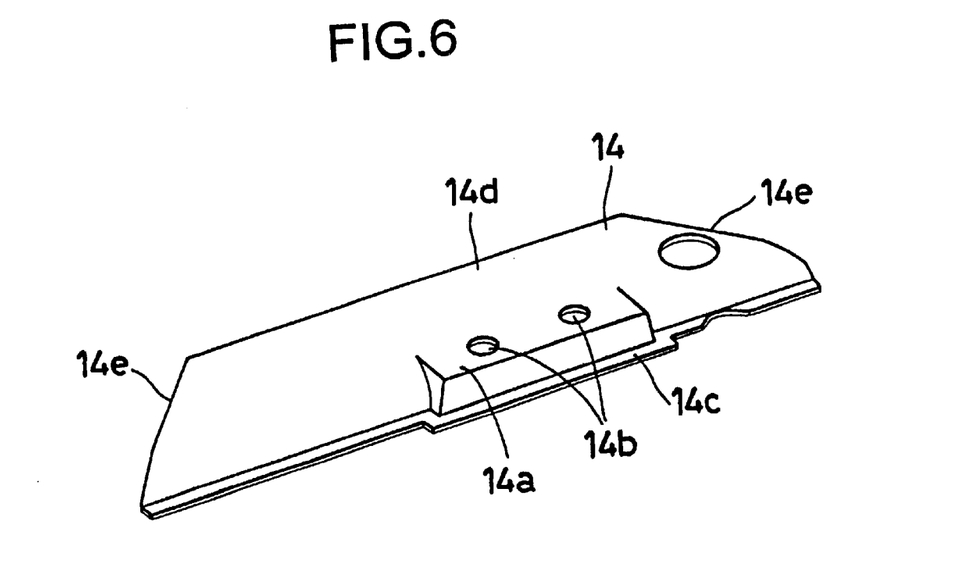
FIG. 6 is a perspective view of a reinforcement shown in FIG. 5.

On the other hand, at a substantially central portion of the suspension frame 5 is provided an engine mount member mounting portion 12. At the engine mount member mounting portion 12, a plurality of (two in the example shown in the figures) cylindrical elements (collars) 13, which penetrate the upper plate 8 and the lower plate 9, are welded. In the closed cross section S of the suspension frame 5, a reinforcement 14 is disposed so as to extend from the front end to the rear end at the substantially central portion of the suspension frame 5 as shown in FIGS. 4 and 5. The reinforcement 14 is provided with a horizontal portion 14a at an intermediate portion of the central portion, and the horizontal portion 14a is formed with through holes 14b for allowing the cylindrical elements 13 to pass through as shown in FIG. 6. A front end portion 14c of the reinforcement 14 is welded to the front portion of the lower plate 9, and a rear end portion 14d thereof is welded to the upper end portion of the rear end rising portion 9c of the lower plate 9 (see FIG. 4). At both corner portions on the rear side of the reinforcement 14 are provided tapered portions 14e, which are assembled to the lower plate 9 by being fixed by welding or the like to inside tapered portions of the lower plate 9 (see FIG. 5).

According to the above-described construction, the reinforcement 14 is joined to the inside of the lower plate 9 in advance, and the closed cross section $S_2$ is formed by the lower plate 9 and the reinforcement 14.

Next, the upper plate 8 is joined to the lower plate 9 to form the suspension frame 5. On the other hand, the lower arm mounting bracket 11 is supported on the suspension lower arm support portion 8a of the upper plate 8 and the suspension lower arm support portion 9a of the lower plate 9, by which the suspension frame 5 is assembled. In the suspension frame 5, the box-shaped closed cross section S is formed around the closed cross section $S_2$ by joining the upper plate 8 to the lower plate 9, so that the rigidity of the central portion can be increased.

Figure 7:
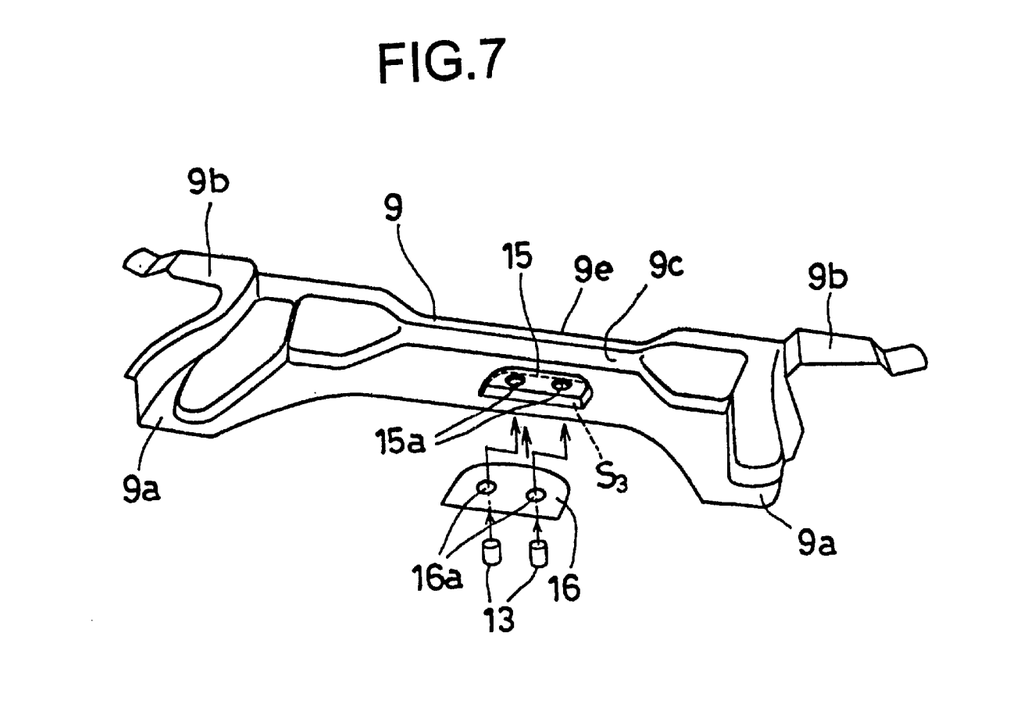
FIG. 7 is a schematic perspective view showing another embodiment of an automotive suspension frame construction in accordance with the present invention.

FIG. 7 shows another embodiment of the present invention, showing a state in which the upper plate 8 is removed.

In this case, a convex portion 15 facing upward is formed at the central portion of the plate surface of the lower plate 9, and a reinforcement 16 is joined to the lower face of the convex portion 15 to form a closed cross section $S_3$.

In this embodiment as well, the rigidity of the central portion of the suspension frame 5 can be increased. The convex portion 15 and the reinforcement 16 are formed with through holes 15a and 16a that allow the cylindrical elements 13 to pass through, respectively, and the cylindrical elements 13 are inserted in the through holes 15a and 16a and are welded to the convex portion 15 and the reinforcement 16. The convex portion 15 in this embodiment and the reinforcement 14 in the above-described embodiment can be used in combination.

The present invention is not limited to the above-described embodiments only, and for example., the reinforcement 14 provided in the closed cross section S formed by the upper plate 8 and the lower plate 9 of the suspension frame 5 may have any shape, and also the number and diameter of the cylindrical elements 13 may be set arbitrarily.

As described above, the automotive suspension frame construction in accordance with the present invention can achieve the effects described below.

In an automotive suspension frame construction in which an upper plate and a lower plate are joined to one another to form a suspension frame, suspension lower arm support portions are provided on each side, right and left, of the suspension frame, and an engine mount member mounting portion is provided at a substantially central portion of the suspension frame, the engine mount member mounting portion of the suspension frame is formed into a closed cross section and a reinforcement is disposed in the closed cross section, cylindrical elements through which engine mount member fastening members are inserted are caused to penetrate the upper plate, reinforcement, and lower plate at positions corresponding to the engine mount member mounting portion of the suspension frame, and the upper plate, reinforcement, and lower plate are welded to the cylindrical elements. Therefore, the rigidity can be increased when a braking force, a transverse force, or an engine mount load is applied. Also, since the upper plate, reinforcement, and lower plate are welded to the cylindrical elements, the rigidity can be increased especially when an engine mount load is applied, so that a mass damper etc. that have been needed conventionally are made unnecessary.

Since the reinforcement is disposed slantwise in the longitudinal direction of a vehicle body, the rigidity can further be increased.

Since a joint portion of the reinforcement and the cylindrical elements is formed into a horizontal shape, the reinforcement and the cylindrical elements can be assembled easily.

The front end portion of at least the central portion of the upper plate is lowered to be joined to the front end portion of the central portion of the lower plate, and the rear end portion of at least the central portion of the lower plate is raised to be joined to the rear end portion of the central portion of the upper plate, whereby a closed cross-sectional construction is formed at the central portion of the suspension frame, and a front end flange portion of the reinforcement is joined to the front lower face of the lower plate and the rear end thereof is joined to the rear upper end of the lower plate by being butted against it. Therefore, the rigidity can be increased when a braking force, a transverse force, or an engine mount load is applied. Also, since the upper plate, reinforcement, and lower plate are welded to the cylindrical elements, the rigidity can be increased especially when an engine mount load is applied.

In an automotive suspension frame construction in which an upper plate and a lower plate are joined to one another to form a suspension frame, suspension lower arm support portions are provided on each side, right and left, of the suspension frame, and an engine mount member mounting portion is provided at a substantially central portion of the suspension frame, the engine mount member mounting portion of the suspension frame is formed into a closed cross section and a portion around the engine mount member mounting portion of the lower plate is formed by being raised, the raised portion is covered by a reinforcement to form a box shape, cylindrical elements through which engine mount member fastening members are inserted are caused to penetrate the upper plate, lower plate, and reinforcement at positions corresponding to the engine mount member mounting portion of the suspension frame, and the upper plate, lower plate, and reinforcement are welded to the cylindrical elements. Therefore, the rigidity can be increased when a braking force, a transverse force, or an engine mount load is applied. Also, since the upper plate, reinforcement, and lower plate are welded to the cylindrical elements, the rigidity can be increased especially when an engine mount load is applied, so that a mass damper etc. that have been needed conventionally are made unnecessary.

What is claimed is:
1. An automotive suspension frame construction in which an upper plate and a lower plate are joined to one another to form a suspension frame, suspension lower arm support portions are provided on each side, right and left, of said suspension frame, and an engine mount member mounting portion is provided at a substantially central portion of said suspension frame, wherein said engine mount member mounting portion of the suspension frame is formed into a closed cross section and a reinforcement is disposed in said closed cross section, cylindrical elements through which engine mount member fastening members are inserted are caused to penetrate said upper plate, reinforcement, and lower plate at positions corresponding to said engine mount member mounting portion of the suspension frame, and said upper plate, reinforcement, and lower plate are welded to said cylindrical elements.

2. The automotive suspension frame construction according to claim 1, wherein said reinforcement is disposed slantwise in the longitudinal direction of a vehicle body.

3. The automotive suspension frame construction according to claim 2, wherein a joint portion of said reinforcement and said cylindrical elements is formed into a horizontal shape.

4. The automotive suspension frame construction according to claim 2, wherein the front end portion of at least the central portion of said upper plate is lowered to be joined to the front end portion of the central portion of said lower plate, and the rear end portion of at least the central portion of said lower plate is raised to be joined to the rear end portion of the central portion of said upper plate, whereby a closed cross-sectional construction is formed at the central portion of said suspension frame, and a front end flange portion of said reinforcement is joined to the front lower face of said lower plate and the rear end thereof is joined to the rear upper end of said lower plate by being butted against the rear upper end of the lower plate.

5. An automotive suspension frame construction in which an upper plate and a lower plate are joined to one another to form a suspension frame, suspension lower arm support portions are provided on each side, right and left, of said suspension frame, and an engine mount member mounting portion is provided at a substantially central portion of said suspension frame, wherein said engine mount member mounting portion of the suspension frame is formed into a closed cross section and a portion around said engine mount member mounting portion of the lower plate is formed by being raised, said raised portion is covered by a reinforcement to form a box shape, cylindrical elements through which engine mount member fastening members are inserted are caused to penetrate said upper plate, lower plate, and reinforcement at positions corresponding to said engine mount member mounting portion of the suspension frame, and said upper plate, lower plate, and reinforcement are welded to said cylindrical elements.

* * * * *

UNITED STATES PATENT AND TRADEMARK OFFICE
CERTIFICATE OF CORRECTION

PATENT NO.     : 6,402,172 B1
DATED          : June 11, 2002
INVENTOR(S)    : Suzuki It is certified that error appears in the above-identified patent and that said Letters Patent is hereby corrected as shown below:

<u>Title page,</u>
Item [73], Assignee, in the address, "Shizuoka-ken" should read -- Hamamatsu --.

Signed and Sealed this

Seventeenth Day of September, 2002

Attest:

Attesting Officer

JAMES E. ROGAN
Director of the United States Patent and Trademark Office